US012568001B2

(12) United States Patent
Yang et al.

(10) Patent No.: US 12,568,001 B2
(45) Date of Patent: Mar. 3, 2026

(54) INFORMATION REPORTING METHOD AND APPARATUS, FIRST DEVICE, AND SECOND DEVICE

(71) Applicant: VIVO MOBILE COMMUNICATION CO., LTD., Guangdong (CN)

(72) Inventors: Ang Yang, Guangdong (CN); Rakesh Tamrakar, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 142 days.

(21) Appl. No.: 18/460,878

(22) Filed: Sep. 5, 2023

(65) Prior Publication Data

US 2023/0412430 A1     Dec. 21, 2023

Related U.S. Application Data

(63) Continuation of application No. PCT/CN2022/078242, filed on Feb. 28, 2022.

(30) Foreign Application Priority Data

Mar. 5, 2021     (CN) .......................... 202110246010.3

(51) Int. Cl.
*H04L 25/02*     (2006.01)
*H04B 17/336*     (2015.01)
*H04W 24/10*     (2009.01)

(52) U.S. Cl.
CPC ....... *H04L 25/0254* (2013.01); *H04B 17/336* (2015.01); *H04W 24/10* (2013.01)

(58) Field of Classification Search
CPC ............. H04L 25/0254; H04L 25/0242; H04L 5/0057; H04L 5/0048; H04L 25/0246;
(Continued)

(56) References Cited

U.S. PATENT DOCUMENTS

2012/0082198 A1     4/2012   Zhang et al.
2015/0282123 A1     10/2015  Miao et al.
(Continued)

FOREIGN PATENT DOCUMENTS

CN          110708129 A      1/2020
JP          2012080522 A     4/2012
(Continued)

OTHER PUBLICATIONS

International Search Report and Written Opinion for Application No. PCT /CN2022/078242, dated May 16, 2022, 11 Pages.
(Continued)

*Primary Examiner* — Sung S Ahn
(74) *Attorney, Agent, or Firm* — BROOKS KUSHMAN P.C.

(57)          ABSTRACT

This application discloses an information reporting method and apparatus, a first device, and a second device. The method includes: reporting first information to a second device; where the first information includes predicted first channel state information or second information determined based on the predicted first channel state information, and the first channel state information includes channel state information of a first time period after a reference time point.

14 Claims, 5 Drawing Sheets

Receive first information reported by a first device, where the first information includes predicted first channel state information or second information determined based on the predicted first channel state information, and the first channel state information includes channel state information of a first time period after a reference time point

601

(58) Field of Classification Search

CPC . H04L 25/0248; H04B 17/336; H04B 7/0626; H04B 7/0695; H04B 17/309; H04B 17/373; H04B 7/063; H04B 7/0632; H04B 7/0639; H04B 7/0658; H04W 24/10; H04W 24/02; H04W 24/08; H04W 72/0446; H04W 72/0453; H04W 72/21; G06N 3/084; G06N 20/00

See application file for complete search history.

(56) References Cited

U.S. PATENT DOCUMENTS

| | | | | |
|---|---|---|---|---|
| 2019/0158247 | A1 | 5/2019 | Zhang et al. | |
| 2019/0207667 | A1 | 7/2019 | Zhou et al. | |
| 2019/0312668 | A1 | 10/2019 | Park et al. | |
| 2020/0136700 | A1* | 4/2020 | Bogale | H04B 7/0456 |
| 2020/0403668 | A1* | 12/2020 | Zhang | H04B 7/0478 |
| 2021/0211912 | A1* | 7/2021 | Zeng | H04L 5/1461 |
| 2021/0409086 | A1* | 12/2021 | Yerramalli | H04W 72/23 |

FOREIGN PATENT DOCUMENTS

| | | | |
|---|---|---|---|
| JP | 2017515323 | A | 6/2017 |
| JP | 2019527969 | A | 10/2019 |
| JP | 2020504581 | A | 2/2020 |
| JP | 2021507619 | A | 2/2021 |
| WO | 2019148399 | A1 | 8/2019 |
| WO | 2020052394 | A1 | 3/2020 |
| WO | 2020155119 | A1 | 8/2020 |
| WO | 2020213141 | A1 | 10/2020 |

OTHER PUBLICATIONS

European Search Report for Application No. 22762475.6, Mailed Dec. 19, 2024, 12 pages.

First Japanese Office Action for Japanese Patent Application No. 2023-554077 dated Sep. 9, 2024. 11 pages.

ZTE, Sanechips. Applications of Artificial Intelligence in MIMO Networks. 3GPP TSG RAN Meeting #90e. RP-202674. Online. Dec. 2020. 14 pages.

* cited by examiner

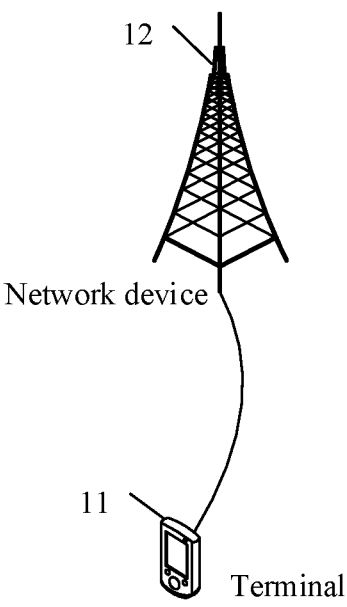

Network device

Terminal

FIG. 3

Report first information to a second device, where the first information includes predicted first channel state information or second information determined based on the predicted first channel state information, and the first channel state information includes channel state information of a first time period after a reference time point ⟋ 401

FIG. 4

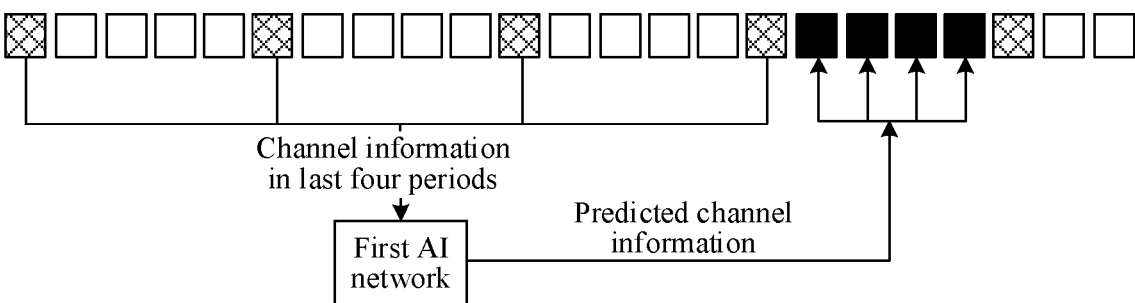

Channel information in last four periods

First AI network

Predicted channel information

FIG. 5

Receive first information reported by a first device, where the first information includes predicted first channel state information or second information determined based on the predicted first channel state information, and the first channel state information includes channel state information of a first time period after a reference time point ⟋ 601
FIG. 6
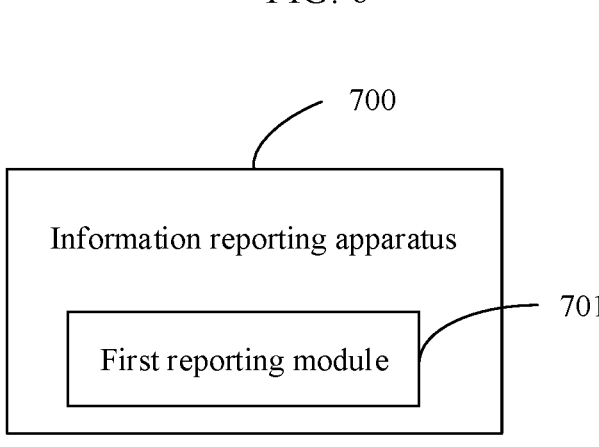
FIG. 7
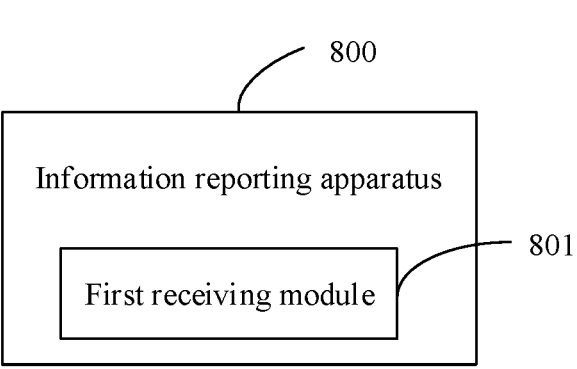
FIG. 8

INFORMATION REPORTING METHOD AND APPARATUS, FIRST DEVICE, AND SECOND DEVICE

CROSS REFERENCE TO RELATED APPLICATIONS

This application is a continuation of PCT International Application No. PCT/CN2022/078242 filed on Feb. 28, 2022, which claims priority to Chinese Patent Application No. 202110246010.3, filed on Mar. 5, 2021, which are incorporated herein by reference in their entireties.

TECHNICAL FIELD

This application relates to the field of communication technologies, and in particular, to an information reporting method and apparatus, a first device, and a second device.

BACKGROUND

In a mobile communication system, channel state information (CSI) is essential to channel capacity, and especially for a multi-antenna system, a transmit end can optimize signal transmission based on CSI to better match a channel state. At present, a CSI report usually includes only current channel state information. When user equipment (UE) (also referred to as a terminal) moves, the CSI information usually becomes out-dated, which may lead to a mismatch in terms of beamforming and modulation and coding scheme, resulting in lower spectral efficiency. It can be learned that there is a prior-art problem of relatively poor accuracy in channel state information obtained by a receive end due to movement of a transmit end.

SUMMARY

Embodiments of this application provide an information reporting method and apparatus, a first device, and a second device.

According to a first aspect, an embodiment of this application provides an information reporting method, performed by a first device. The method includes:

reporting first information to a second device; where the first information includes predicted first channel state information or second information determined based on the predicted first channel state information, and the first channel state information includes channel state information of a first time period after a reference time point.

According to a second aspect, an embodiment of this application further provides an information reporting method, performed by a second device. The method includes:

receiving first information reported by a first device; where the first information includes predicted first channel state information or second information determined based on the predicted first channel state information, and the first channel state information includes channel state information of a first time period after a reference time point.

According to a third aspect, an embodiment of this application provides an information reporting apparatus, where the apparatus includes:

a first reporting module, configured to report first information to a second device; where the first information includes predicted first channel state information or second information determined based on the predicted first channel state information, and the first channel state information includes channel state information of a first time period after a reference time point.

According to a fourth aspect, an embodiment of this application further provides an information reporting apparatus, where the apparatus includes:

a first receiving module, configured to receive first information reported by a first device; where the first information includes predicted first channel state information or second information determined based on the predicted first channel state information, and the first channel state information includes channel state information of a first time period after a reference time point.

According to a fifth aspect, an embodiment of this application further provides a first device, where the first device includes a processor, a memory, and a program or instructions stored in the memory and capable of running on the processor, and when the program or the instructions are executed by the processor, the steps of the method according to the first aspect are implemented.

According to a sixth aspect, an embodiment of this application further provides a second device, where the second device includes a processor, a memory, and a program or instructions stored in the memory and capable of running on the processor, and when the program or the instructions are executed by the processor, the steps of the method according to the second aspect are implemented.

According to a seventh aspect, an embodiment of this application further provides a readable storage medium, where a program or instructions are stored in the readable storage medium, and when the program or the instructions are executed by a processor, the steps of the method according to the first aspect are implemented, or the steps of the method according to the second aspect are implemented.

According to an eighth aspect, an embodiment of this application provides a chip, where the chip includes a processor and a communication interface, the communication interface is coupled to the processor, and the processor is configured to run a program or instructions of the second device to implement the method according to the first aspect or the method according to the second aspect.

According to a ninth aspect, a computer program product is provided, where the computer program product is stored in a non-volatile storage medium, and the computer program product is executed by at least one processor to implement the method according to the first aspect or the method according to the second aspect.

BRIEF DESCRIPTION OF THE DRAWINGS

FIG. 3 is a structural diagram of a network system to which the embodiments of this application are applicable;

FIG. 4 is a flowchart of an information reporting method according to an embodiment of this application;

FIG. 5 is a schematic diagram of channel state information predicted by a first AI network according to an embodiment of this application;

FIG. 6 is a flowchart of an information reporting method according to an embodiment of this application;

FIG. 7 is a structural diagram of an information reporting apparatus according to an embodiment of this application;

FIG. 8 is a structural diagram of another information reporting apparatus according to an embodiment of this application;

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments in this application fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communication system.

For ease of understanding, the following describes some content included in the embodiments of this application:

1. Artificial Intelligence

Artificial intelligence is currently widely used in various fields. Artificial intelligence (AI) networks are implemented in a variety of manners, for example, neural network, decision tree, support vector machine, and Bayesian classifier. The following uses a neural network as an example for illustration, which, however, does not limit a specific type of AI network.

Figure 1:
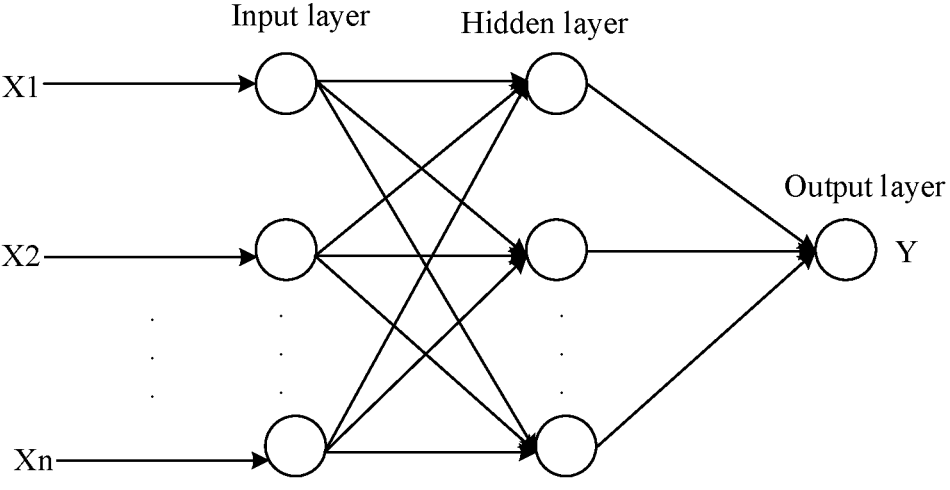
FIG. 1 is a schematic diagram of a neural network according to an embodiment of this application.
Figure 2:
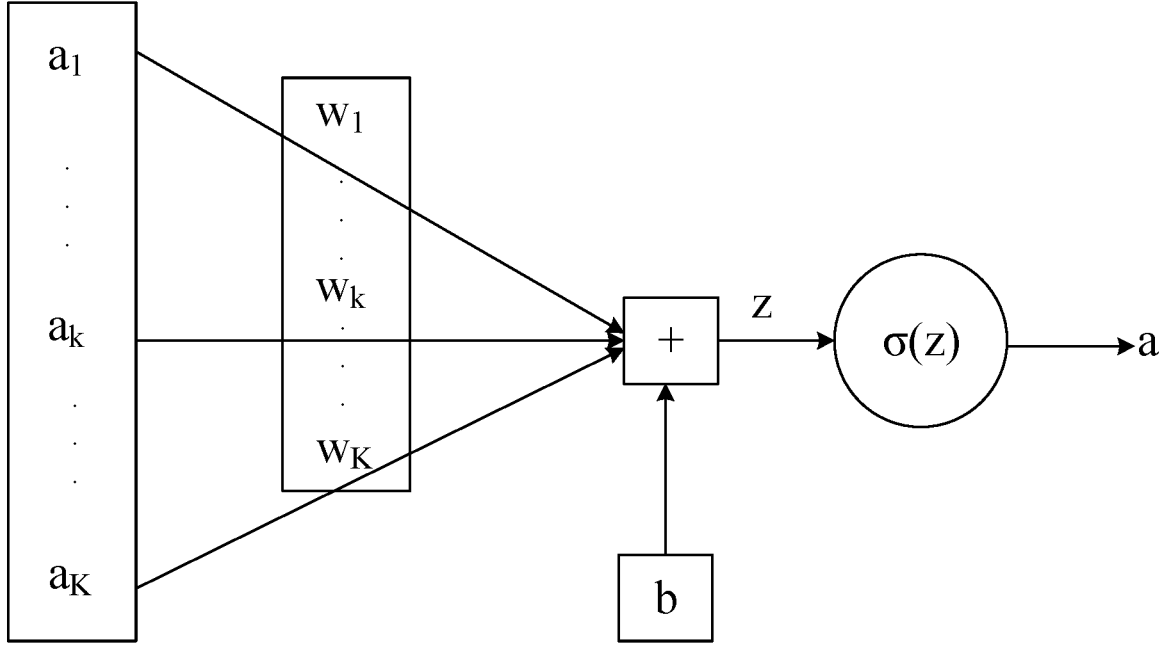
FIG. 2 is a schematic diagram of neurons according to an embodiment of this application.

A schematic diagram of a neural network may be shown in FIG. 1. The neural network includes neurons, and a schematic diagram of the neurons may be shown in FIG. 2.

$z=a1w1+ \ldots +akwk+ \ldots +aKwK+b$, where $a1, a2, \ldots,$ and $aK$ are the input, $w$ is a weight (multiplicative coefficient), $b$ is a bias (additive coefficient), and $\sigma(\cdot)$ is an activation function. Common activation functions include Sigmoid, tan h, ReLU (Rectified Linear Unit), and so on.

Parameters of the neural network are optimized through optimization algorithm, where the optimization algorithm may be a type of algorithm capable of minimizing or maximizing an objective function (also referred to as a loss function). The objective function is usually a mathematical combination of model parameters and data. For example, given data X and its corresponding label Y, a neural network model $f(\cdot)$ is constructed. After the neural network model is constructed, a predicted output $f(x)$ can be obtained based on an input x, and a difference $(f(x)-Y)$ between a predicted value and a true value can be calculated, which is referred to as a loss function. The purpose of training a neural network model is to find suitable values for w and b to minimize the value of the loss function. A smaller loss value indicates a neural network model being closer to the real situation.

Current common optimization algorithms are basically based on an error back propagation (BP) algorithm. The basic idea of the BP algorithm is that the learning process includes two phases: signal forward propagation and error backward propagation. For forward propagation, input samples are input from an input layer, undergo processing at each hidden layer, and then are passed to an output layer. If an actual output of the output layer does not match an expected output, the process enters the phase of error backward propagation. Error backward propagation involves propagating an output error back through the hidden layers to the input layer in some forms, and distributing the error among all units at each layer, so as to obtain error signals for the units at each layer. The error signals are then used as a basis for rectifying a weight of each unit. This process of weight adjustment at each layer for signal forward propagation and error backward propagation is repeated iteratively. The process of continuously adjusting weights is a learning and training process of the network. This process continues until an error output by the network is reduced to an acceptable level or until a pre-determined number of learning times is reached.

Common optimization algorithms include gradient descent, stochastic gradient descent (SGD), mini-batch gradient descent, momentum, stochastic gradient descent with momentum (Nesterov), adaptive gradient descent (Adagrad), Adadelta, root mean square prop (RMSprop), adaptive moment estimation (Adam), and the like.

During error backward propagation for the optimization algorithm, the error/loss is obtained based on the loss function, and a derivative/partial derivative of the current neuron is calculated, taking into account factors such as learning rate and previous gradients/derivatives/partial derivatives, to obtain the gradient, and then the gradient is passed to a previous layer.

2. Multi-Antenna

Radio access technology standards such as long term evolution (LTE) or long term evolution-Advanced (LTE-A) are all established based on multiple-input multiple-output (MIMO) MIMO and orthogonal frequency division multiplexing (OFDM) technologies. In the MIMO technology, spatial freedom obtained by the multi-antenna system is used to improve the peak rate and system spectrum utilization.

In the process of standardization development, the MIMO technology develops in more dimensions. In LTE release 8

(Rel-8), a maximum of four layers can be supported for MIMO transmission. In the enhanced multi-user MIMO (MU-MIMO) technology in LTE release 9 (Rel-9), a maximum of four downlink data layers can be supported for MU-MIMO transmission in transmission mode (TM)-8. In release 10 (Rel-10), the transmission capability in single-user MIMO (SU-MIMO) supports a maximum of eight data layers.

The MIMO technology advances towards a three-dimensional and massive prospect. Currently, the third Generation Partnership Project (3GPP) has completed the research project on three-dimensional (3D) channel modeling and is conducting research and standardization work on eFD-MIMO and new radio (NR) MIMO. It is predicable that a more massive MIMO technology with more antenna ports will be introduced in the future fifth generation (5G) mobile communication system.

The massive MIMO technology uses massive antenna arrays to greatly improve utilization of system bands and support a larger quantity of access users. Therefore, major research organizations consider the massive MIMO technology as one of the most promising physical layer technologies in the next-generation mobile communication system.

If an all-digital array is used in the massive MIMO technology, maximized spatial resolution and optimal MU-MIMO performance can be achieved. However, this structure requires a large number of AD/DA conversion components and a large number of complete radio frequency-baseband processing channels, imposing a huge burden on both device costs and baseband processing complexity.

In order to avoid the aforementioned implementation costs and device complexity, the digital-analog hybrid beamforming technology emerges, that is, on the basis of conventional digital beamforming, one more stage of beamforming is applied to radio frequency signals near a front end of an antenna system. With analog beamforming, transmit signals and channels can be roughly matched in a relatively simple manner. A dimension of equivalent channels formed through analog beamforming is smaller than an actual quantity of antennas, so that a quantity of required AD/DA converters, a quantity of digital channels, and corresponding baseband processing complexity can be greatly reduced. Residual interference resulting from analog beamforming can be further processed in the digital domain to ensure MU-MIMO transmission quality. Compared with all-digital beamforming, digital-analog hybrid beamforming is a compromise scheme in terms of performance and complexity, and has a higher practical prospect in a high-frequency or large-bandwidth system or a system with a large number of antennas.

3. Reporting of Channel State Information (CSI) in NR

It can be learned based on the information theory that accurate channel state information is essential for channel capacity. Especially for a multi-antenna system, a transmit end can optimize signal transmission based on CSI to better match a channel state. Currently, CSI reporting in NR includes rank indicator (RI), channel quality indicator (CQI), precoding matrix indicator (PMI), layer indicator (LI), and beam quality, such as layer 1 reference signal received power (L1-RSRP). CQI may be used for selecting an appropriate modulation and coding scheme (MCS) to implement link adaptation. PMI may be used for eigen beamforming to maximize a received signal strength or to suppress interference (such as inter-cell interference or multi-user interference). Therefore, since the introduction of multi-antenna technology (MIMO), CSI acquisition has always been a research hotspot. If channel reciprocity is present, for example, in a time division duplexing (TDD) system, the terminal sends a sounding reference signal (SRS) to a network device, and then the network device performs channel estimation based on the SRS to obtain uplink channel information. If no channel reciprocity is present, for example, in a frequency division duplexing (FDD) system, for an uplink channel represented by SRS, downlink channel information cannot be accurately obtained. In this case, the network device needs to send a channel state information reference signal (CSI-RS), and the terminal performs channel estimation based on the CSI-RS to obtain the downlink channel information, and then feeds back a PMI to the network device according to a protocol-specified codebook. The network device can restore the downlink channel information based on the codebook and PMI.

Currently, the codebooks are divided into Type I codebook and Type II codebook, the core idea of which is constructing codewords according to specific rules based on oversampled two-dimensional discrete fourier transformation beam (oversampled 2D DFT beam). A corresponding channel vector or matrix can be retrieved based on bit information of PMI.

In Type I single-panel CSI codebook, a precoding matrix W may indicate a product of two matrices W1 and W2. Information of W1 and W2 is reported separately. W1 represents long-term and frequency-independent channel characteristics, and the terminal reports only one W1 for the entire reporting bandwidth. W2 attempts to capture short-term and frequency-dependent channel characteristics, and the terminal reports one W2 for each sub-band or does not report W2. W1 and W2 are composed of oversampled 2D DFT beams.

A difference between Type II and Type I lies in that only one beam is reported for Type I ultimately while a maximum of four orthogonal beams are reported for Type II. For each beam as well as its two polarization directions of the beam, the reported PMI provides a corresponding amplitude value (broadband and sub-band) and phase value (sub-band). In this way, for Type II, main propagation paths and their corresponding amplitudes and phases are captured for Type II, thus providing more detailed channel information. Certainly, overheads for Type II are generally larger than those for Type I.

In an information reporting method provided in the embodiments of this application, a first device may be a terminal or a network device, and similarly, a second device may be a terminal or a network device. To facilitate understanding, in this embodiment of this application, the first device being a terminal and the second device being a network device are used as an example for description.

FIG. 3 is a block diagram of a wireless communication system to which the embodiments of this application are applicable. The wireless communication system includes a terminal 11 and a network device 12. The terminal 11 may also be referred to as a terminal device or user terminal (User Equipment, UE), and the terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application.

The network device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that a same technical effect is achieved, the base station is not limited to a specific technical term. It should be noted that in the embodiments of this application, the base station in the NR system is merely used as an example and a specific type of the base station is not limited.

The following describes in detail an information reporting method provided in the embodiments of this application by using specific embodiments and application scenarios thereof with reference to the accompanying drawings.

Referring to FIG. 4, FIG. 4 is a flowchart of an information reporting method according to an embodiment of this application. The method is executed by a first device, and as shown in FIG. 4, includes the following steps.

Step 401: Report first information to a second device.

The first information includes predicted first channel state information or second information determined based on the predicted first channel state information, and the first channel state information includes channel state information of a first time period after a reference time point.

In this embodiment, the first device may be a terminal or a network device; and the second device may be a terminal or a network device. For example, the first device is a terminal and the second device is a network device, or the first device is a terminal and the second device is a terminal that can communicate with the first device, for example, the second device communicates with the first device through sidelink, for example, in an Internet of vehicles and the Internet of things scenario.

The reference time point may be a time point related to current channel state information, for example, a configuration time of the current channel state information, a sending time of the current channel state information, a receiving time of the current channel state information, an activation time for reporting of the current channel state information, a trigger time for reporting of the current channel state information, or a reference signal measurement time of the current channel state information. The first time period, for example, may be K CSI reporting periods, K RS periods, K slots, K half slots, K symbols, K subframes, and K radio frames, K milliseconds, K seconds, or K minutes after the reference time point. It can be understood that the first time period may further include K other common time units located after the reference time point, which are not listed herein one by one, where K is a positive integer.

The first channel state information may be channel state information predicted based on at least one of channel state information of a current moment or channel state information of a historical moment. It should be noted that the first channel state information may include one or more pieces of channel state information within the first time period, for example, if the first time period includes K slots, the first channel state information may include channel state information for each of the K slots.

The second information may be information obtained through target processing on the first channel state information, where the target processing may include but is not limited to at least one of encoding processing, compression processing, or combination processing.

In the information reporting method provided in this embodiment of this application, the predicted channel state information of the first time period to the second device, that is, channel state information of a time period in the future is reported to the second device. In this way, the second device can obtain more accurate channel information when the first device moves, reducing the impact of movement of the first device on the communication quality of service.

Optionally, the first channel state information may include at least one of the following: precoding matrix indicator PMI, channel quality indicator CQI, rank indicator RI, layer indicator LI, original channel information, channel quality index value, beam information, time-domain stability index value of channel, large-scale parameter of channel, or first-device location information indicated by channel.

It can be understood that the first channel state information may further include other common channel state feature information, which will not be listed herein.

In this embodiment, the foregoing PMI may also be referred to as beamforming information, and may be used to implement eigen beamforming. The original channel information may be used to reflect original channel information, for example, a channel matrix or feature information obtained through decomposition of a channel matrix. The channel quality index value may include but is not limited to at least one of signal-to-noise ratio (SNR), signal to interference plus noise ratio (SINR), signal power, noise power, or interference power. The beam information may include but is not limited to a reference signal (RS) identifier of a beam, beam quality information, and the like. The time-domain stability index value of channel may be used to reflect a change status of channel information, for example, a variance, worst value, optimal value, change range, or the like of channel information within a time period. The large-scale parameter of channel may include but is not limited to Doppler shift, Doppler spread, average delay, delay spread, and the like. The first-device location information indicated by channel may be first-device location information determined based on channel information.

Optionally, the original channel information includes at least one of the following: a channel matrix, or feature information obtained by decomposing the channel matrix in a target decomposition manner.

In this embodiment, the channel matrix may include channel information from each antenna or transmit/receive unit (TX, RU) at the transmit end to each antenna or transmit/receive unit (TX, RU) at the receive end, including at least one of amplitude, phase, delay, Doppler spread, and the like.

The feature information obtained by decomposing the channel matrix in the target decomposition manner may include at least one of an eigen vector, an eigen matrix, or an eigen value obtained by decomposing the channel matrix in the target decomposition manner. For example, the channel matrix may include eigen vectors (also referred to as singular vectors or SVD vectors) or eigen values (also referred to as singular values) obtained by performing singular value decomposition (SVD) on the channel matrix.

Optionally, the target decomposition manner includes at least one of the following: singular value decomposition, triangular decomposition, regular triangular decomposition (QR Factorization), Cholesky decomposition, or spectral decomposition.

It should be noted that, in a case that there are multiple target decomposition manners, the feature information obtained by decomposing the channel matrix in the target decomposition manner may include feature information obtained by the channel matrix separately in each decomposition manner. For example, if the target decomposition manner includes singular value decomposition and triangular decomposition, the feature information obtained by decomposing the channel matrix in the target decomposition manners may include feature information obtained by decomposing the channel matrix through singular value decomposition, for example, singular vectors or singular values, and feature information obtained by decomposing the channel matrix through triangular decomposition, for example, eigen matrix, eigen vectors, or eigen values.

Optionally, the beam information may include:

a reference signal RS identifier of beam and a beam quality index value in each time unit of the first time period;

or an RS identifier of beam in each time unit of the first time period and a beam quality index value corresponding to the RS identifier.

In this embodiment, the time unit may include but is not limited to a CSI reporting period, an RS period, a slot, a half slot, a symbol, a subframe, a radio frame, millisecond, second, or minute. The beam quality index value may be used for measuring beam quality, for example, may include reference signal received power (RSRP), reference signal received quality (RSRQ), SINR, and the like.

In an implementation, a reference signal identifier (RS ID) of the beam within the first time period remains unchanged, and beam quality of the RS may change. In this case, the beam information may include the RS ID of the beam and a beam quality index value of each time unit in the first time period. For example, if the first time period includes multiple slots, the beam information may include the RS ID of the beam and a beam quality index value of each slot within the first time period.

In another implementation, both the RS ID of the beam within the first time period and the beam quality remain unchanged. In this case, the beam information may include an RS ID of each time unit in the first time period and a beam quality index value corresponding to the RS ID. For example, if the first time period includes multiple symbols, the beam information may include an RS ID of a beam in each symbol within the first time period and a beam quality index value corresponding to the RS ID.

Optionally, the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

In this embodiment, the second time period may be the first time period or a time period within the first time period. The channel state information within the second time period may include but is not limited to at least one of PMI, CQI, RI, LI, channel quality index value, or large-scale parameter of channel within the second time period. It should be noted that the channel state information within the second time period includes a plurality of pieces of channel state information within the second time period, for example, the channel state information within the second time period includes a plurality of PMIs in the second time period. The limit value of channel state information within the second time period may be an optimal value or a worst value of channel state information within the second time period.

For example, the second time period includes CQI #1 to CQI #m, where m is an integer greater than 1 and an optimal value in CQI #1 to CQI #m is a value of CQI #2. In this case, a difference between a value of each CQI in CQI #1 to CQI #m and the value of CQI #2 can be calculated separately. For another example, the second time period includes RI #1 to RI #n, where n is an integer greater than 1, a maximum value of RI #1 to RI #n is a value x1 of RI #1, and a minimum value is a value x2 of RI #3. A change range of RI is [x2, x1].

In this embodiment, the time-domain stability index value of channel may include at least one of the foregoing various index values, or an index value obtained by calculating the various index values in a preset calculation manner, where the preset calculation manner may include but is not limited to at least one of addition, subtraction, multiplication, division, N-th power, N-th root square, logarithm, derivation, or partial derivation. N may be any number, for example, N may be a positive number, a negative number, or 0, or N may be a real number or a complex number.

Optionally, a start time point of the first time period is one of the following: the reference time point, a time point with a first duration ahead of the reference time point, and a time point with a second duration behind the reference time point; and an end time point of the first time period is one of the following: a time point with K time units after the start time point of the first time period, a time point with a third duration ahead of K time units after the start time point of the first time period, and a time point with a fourth duration behind K time units after the start time point of the first time period, where K is a positive integer.

In this embodiment, at least one of the first duration, the second duration, the third duration, the fourth duration, a value of K, or a type of time unit may be predefined by a protocol or configured by the second device.

The first duration ahead of the reference time point may be: the reference time point−the first duration. The second duration behind the reference time point may be: the reference time point+the second duration. The K time units after the start time point of the first time period may be: the start time point of the first time period+K time units. The third duration ahead of K time units after the start time point of the first time period may be: the start time point of the first time period−the third duration+K time units. The fourth duration behind K time units after the start time point of the first time period may be: the start time point of the first time period+K time units+the fourth duration.

For example, K time units are K CSI reporting periods, a start phase is delayed for 3 slots, and an end phase is advanced by 2 slots. In this case, the start time point of the first time period may be: the reference time point+3 slots, and the end time point of the first time period may be: the reference time point+3 slots+K CSI reporting periods−2 slots.

Optionally, the time unit includes one of the following: CSI reporting period, RS period, slot, half slot, symbol, subframe, radio frame, millisecond, second, and minute.

In this embodiment, the RS period may be a period of an RS used for CSI feedback measurement. The symbol may be an orthogonal frequency division multiplexing (OFDM) symbol.

Optionally, parameters of the first time period are configured by the second device.

The parameters of the first time period include at least one of the following: the first duration, the second duration, a value of K, a type of the time unit, the third duration, or the fourth duration.

In this embodiment, the type of the time unit includes a CSI reporting period, an RS period, a slot, a half slot, a symbol, a subframe, a radio frame, millisecond, second, minute, or the like.

Optionally, the parameters of the first time period may be configured or activated by the second device via radio resource control (RRC), media access control control element (MAC CE), or downlink control information (DCI).

Optionally, the reference time point includes one of the following: a configuration time of current channel state information, a sending time of the current channel state information, a receiving time of the current channel state information, an activation time for reporting of the current channel state information, a trigger time for reporting of the current channel state information, and a reference signal measurement time of the current channel state information.

In this embodiment, for the activation time or trigger time for reporting of the current channel state information, for example, if the reporting of the current channel state information is activated or triggered via DCI, a sending time of the DCI or a receiving time of the DCI is the activation time or trigger time for reporting of the current channel state information.

Optionally, the first channel state information is predicted based on second channel state information, and the second channel state information includes at least one of the following:

channel state information of the reference time point; or
channel state information of a third time period before the reference time point.

In this embodiment, both the channel state information of the reference time point and the channel state information of a third time period before the reference time point may include at least one of PMI, CQI, RI, LI, original channel information, channel quality index value, beam information, time-domain stability index value of channel, large-scale parameter of channel, or first-device location information indicated by channel. For detailed description of the related content, reference may be made to the foregoing description of the first channel state information, and details are not repeated herein.

An end time point of the third time period may be one of the following: the reference time point, a time point with a fifth duration ahead of the reference time point, and a time point with a sixth duration behind the reference time point; and a start time point of the third time period is one of the following: a time point with J time units before the end time point of the third time period, a time point with a seventh duration ahead of J time units before the end time point of the third time period, and a time point with an eighth duration behind J time units before the end time point of the third time period, where J is a positive integer.

At least one of the fifth duration, the sixth duration, the seventh duration, the eighth duration, a value of J, or a type of the time unit may be predefined by the protocol, or may be configured by the second device. The type of the time unit may include a CSI reporting period, an RS period, a slot, a half slot, a symbol, a subframe, a radio frame, millisecond, second, minute, and the like.

In this embodiment of this application, the channel state information of the first time period is predicted based on at least one of the channel state information of the reference time point or the channel state information of the third time period before the reference time point, which can improve accuracy of the predicted channel state information.

Optionally, in order to further improve accuracy of the channel information prediction, in this embodiment of this application, the channel state information of the first time period may be predicted based on channel feature information such as second channel state information, a moving speed of the first device, a signal-to-noise ratio or signal-to-interference-noise ratio of channel, channel broadband feature, time-domain correlation of channel, frequency domain correlation of channel, and delay-Doppler domain feature of channel.

Optionally, the first channel state information is channel state information output by a first AI network after the second channel state information is input into the first AI network.

In this embodiment, the first AI network may be a pre-trained AI network for predicting channel state information, for example, a pre-trained neural network for predicting channel state information.

In an actual application, the second channel state information may be input into the first AI network, and the first AI network outputs predicted channel state information based on the second channel state information. For example, as shown in FIG. 5, based on channel information obtained by measuring periodic reference signals in last four periods, the first AI network predicts channel information of four slots before a next reference signal measurement period, where one reference signal measurement period is 5 slots.

It should be noted that, in addition to the second channel state information, channel feature information such as the moving speed of the first device, signal-to-noise ratio or signal-to-interference-noise ratio of channel, channel broadband feature, time-domain correlation of channel, frequency domain correlation of channel, and delay-Doppler domain feature of channel may be further input into the first AI network, which are not limited in this embodiment.

In addition, it should be further noted that a format of the first channel state information output by the first AI network may be properly set according to actual needs, and for example, may be in a binary format.

Optionally, the second information is information obtained through target processing on the first channel state information, and the target processing includes at least one of encoding processing or compression processing.

In this embodiment, the encoding processing may include but is not limited to entropy encoding, Huffman encoding, or the like. The compression processing may include but is not limited to lossy compression or lossless compression.

For example, if the first channel state information includes channel state information of K time units, that is, includes channel state information of the first time unit, channel state information of the second time unit until channel state information of the K-th time unit, encoding processing and compression processing may be performed on the channel state information of the K time units, and then sent to the second device, so as to reduce a transport data size and resource overheads.

Optionally, the method further includes:

reporting channel state information of the reference time point to the second device.

In this embodiment, the first device may report the channel state information of the reference time point and the predicted channel state information of the first time period to the second device, so that the second device can obtain richer channel state information to obtain the channel state more accurately.

Optionally, the first channel state information includes at least one of broadband channel state information or sub-band channel state information.

Optionally, the sub-bands are divided in one of the following manners: divided by frequency domain, divided by code domain, divided by space domain, divided by delay domain, and divided by Doppler domain.

In this embodiment, for division by frequency domain, frequency domain resources are divided in a manner, for example, by resource block (RB), physical resource block (PRB), sub-band, physical resource group (PRG), or bandwidth part (BWP). For division by code domain, code domain resources are divided in a manner, for example, by orthogonal code, quasi-orthogonal code, or semi-orthogonal code. For division by space domain, space domain resources are divided in a manner, for example, by antenna, antenna element, antenna panel, transmit and receive unit, beam, layer, rank, or antenna angle.

Optionally, information type of the first channel state information is the same as information type of channel state information of the reference time point;

or the information type of the first channel state information is determined based on capability information of the first device;

or the information type of the first channel state information is configured by the second device;

or the information type of the first channel state information is broadband channel state information;

or the information type of the first channel state information is sub-band channel state information; where the information type includes broadband channel state information and sub-band channel state information.

In an implementation, the information type of the first channel state information is the same as the information type of the channel state information of the reference time point. For example, if the channel state information of the reference time point is broadband channel state information, the first channel state information is broadband channel state information; and if the channel state information of the reference time point is sub-band channel state information, the first channel state information is sub-band channel state information.

In another implementation, the information type of the first channel state information is determined based on capability information of the first device. For example, if a capability of the first device supports only broadband channel state information, the first channel state information is broadband channel state information; or if the capability of the first device supports only sub-band channel state information, the first channel state information is sub-band channel state information.

Optionally, if the capability of the first device supports both broadband channel state information and sub-band channel state information, the first channel state information may be sub-band channel state information.

Optionally, if the capability of the first device supports both broadband channel state information and sub-band channel state information, the information type of the first channel state information may be determined based on other parameters, for example, the information type of the first channel state information may be determined based on configuration parameters sent by the second device.

In another implementation, the information type of the first channel state information is configured by the second device. For example, if the information type of the first channel state information configured by the second device is broadband channel state information, the first channel state information is broadband channel state information; or if the information type of the first channel state information configured by the second device is sub-band channel state information, the first channel state information is sub-band channel state information.

In another implementation, the information type of the first channel state information is broadband channel state information, regardless of whether the information type of the channel state information of the reference time point is broadband channel state information or sub-band channel state information.

In another implementation, the information type of the first channel state information is sub-band channel state information, regardless of whether the information type of the channel state information of the reference time point is broadband channel state information or sub-band channel state information.

Optionally, before the step of reporting the first information to the second device, the method further includes:

receiving a first indication sent by the second device, where the first indication is used to indicate the first device to report predicted channel state information.

In this embodiment, the first device may receive the first indication sent by the second device via RRC, MAC CE, DCI, or the like, and performs the foregoing step 401 in a case that the first indication is received.

In actual applications, the second device may activate, via RRC, MAC CE, DCI, or the like, the information reporting method provided in this embodiment of this application. Optionally, in a case that the first device receives the first indication sent by the second device, if the first device supports reporting of predicted channel state information, the foregoing step 401 is performed.

It should be noted that the foregoing implementations of this embodiment may be combined according to actual requirements.

Referring to FIG. 6, FIG. 6 is a flowchart of another information reporting method according to an embodiment of this application. The method is executed by a second device, and as shown in FIG. 6, includes the following steps.

Step 601: Receive first information reported by a first device.

The first information includes predicted first channel state information or second information determined based on the predicted first channel state information, and the first channel state information includes channel state information of a first time period after a reference time point.

In this embodiment, the first device may be a terminal or a network device; and the second device may be a terminal or a network device. For example, the first device is a terminal and the second device is a network device, or the first device is a terminal and the second device is a terminal that can communicate with the first device, for example, the second device communicates with the first device through sidelink.

The reference time point may be a time point related to current channel state information, for example, a configuration time of the current channel state information, a sending time of the current channel state information, a receiving time of the current channel state information, an activation time for reporting of the current channel state information, a trigger time for reporting of the current channel state information, or a reference signal measurement time of the current channel state information. The first time period, for example, may be K CSI reporting periods, K RS periods, K slots, K half slots, K symbols, K subframes, and K radio frames, K milliseconds, K seconds, or K minutes after the reference time point, where K is a positive integer.

The first channel state information may be channel state information predicted based on at least one of channel state information of a current moment or channel state information of a historical moment. It should be noted that the first channel state information may include one or more pieces of channel state information within the first time period, for example, if the first time period includes K slots, the first channel state information may include channel state information for each of the K slots.

The second information may be information obtained through target processing on the first channel state information, where the target processing may include but is not limited to at least one of encoding processing, compression processing, or combination processing.

In actual applications, after receiving the first information, the second device may determine expected channel state information based on the first information, or determine expected channel state information based on the first information and the channel state information of the reference time point. It should be noted that the type of the expected channel state information and the type of the first information may be the same, for example, the information type of the first information is predicted CQI of the first time period, or the expected channel state information may be CQI. The type of the expected channel state information and the type of the first information may alternatively be different, for example, the first information is predicted CQI of the first time period, and the expected channel state information may be a channel matrix.

In the information reporting method provided in this embodiment of this application, the predicted channel state information of the first time period reported by the first device is received, that is, channel state information of a time period in the future reported by the first device is received. In this way, the second device can obtain more accurate channel information when the first device moves, reducing the impact of movement of the first device on the communication quality of service.

Optionally, the first channel state information includes at least one of the following: precoding matrix indicator PMI, channel quality indicator CQI, rank indicator RI, layer indicator LI, original channel information, channel quality index value, beam information, time-domain stability index value of channel, large-scale parameter of channel, or first-device location information indicated by channel.

For implementation of this embodiment, reference may be made to related descriptions of the embodiment shown in FIG. 4, and details are not described herein.

Optionally, the original channel information includes at least one of the following: a channel matrix, or feature information obtained by decomposing the channel matrix in a target decomposition manner.

For implementation of this embodiment, reference may be made to related descriptions of the embodiment shown in FIG. 4, and details are not described herein.

Optionally, the target decomposition manner includes at least one of the following: singular value decomposition, triangular decomposition, regular triangular decomposition, Cholesky decomposition, or spectral decomposition.

For implementation of this embodiment, reference may be made to related descriptions of the embodiment shown in FIG. 4, and details are not described herein.

Optionally, the beam information includes:
a reference signal RS identifier of beam and a beam quality index value in each time unit of the first time period;
or
an RS identifier of beam in each time unit of the first time period and a beam quality index value corresponding to the RS identifier.

For implementation of this embodiment, reference may be made to related descriptions of the embodiment shown in FIG. 4, and details are not described herein.

Optionally, the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

For implementation of this embodiment, reference may be made to related descriptions of the embodiment shown in FIG. 4, and details are not described herein.

Optionally, a start time point of the first time period is one of the following: the reference time point, a time point with a first duration ahead of the reference time point, and a time point with a second duration behind the reference time point; and
an end time point of the first time period is one of the following: a time point with K time units after the start time point of the first time period, a time point with a third duration ahead of K time units after the start time point of the first time period, and a time point with a fourth duration behind K time units after the start time point of the first time period, where K is a positive integer.

For implementation of this embodiment, reference may be made to related descriptions of the embodiment shown in FIG. 4, and details are not described herein.

Optionally, the time unit includes one of the following: CSI reporting period, RS period, slot, half slot, symbol, subframe, radio frame, millisecond, second, and minute.

For implementation of this embodiment, reference may be made to related descriptions of the embodiment shown in FIG. 4, and details are not described herein.

Optionally, parameters of the first time period are configured by the second device.

The parameters of the first time period include at least one of the following: the first duration, the second duration, a value of K, a type of the time unit, the third duration, or the fourth duration.

For implementation of this embodiment, reference may be made to related descriptions of the embodiment shown in FIG. 4, and details are not described herein.

Optionally, the reference time point includes one of the following: a configuration time of current channel state information, a sending time of the current channel state information, a receiving time of the current channel state information, an activation time for reporting of the current channel state information, a trigger time for reporting of the current channel state information, and a reference signal measurement time of the current channel state information.

For implementation of this embodiment, reference may be made to related descriptions of the embodiment shown in FIG. 4, and details are not described herein.

Optionally, the first channel state information is predicted based on second channel state information, and the second channel state information includes at least one of the following:

channel state information of the reference time point; or channel state information of a third time period before the reference time point.

For implementation of this embodiment, reference may be made to related descriptions of the embodiment shown in FIG. 4, and details are not described herein.

Optionally, the first channel state information is channel state information output by a first AI network after the second channel state information is input into the first AI network.

For implementation of this embodiment, reference may be made to related descriptions of the embodiment shown in FIG. 4, and details are not described herein.

It should be noted that after receiving the channel state information output by the first AI network (that is, the first channel state information), the second device may input the first channel state information into a second AI network to obtain expected channel state information. The second AI network and the first AI network may be two AI networks obtained through joint training, where the first AI network is used for the encoding process, and the second AI network is used for the decoding process.

Optionally, the second information is information obtained through target processing on the first channel state information, and the target processing includes at least one of encoding processing or compression processing.

For implementation of this embodiment, reference may be made to related descriptions of the embodiment shown in FIG. 4, and details are not described herein.

Optionally, the method further includes:

receiving channel state information of the reference time point reported by the first device.

For implementation of this embodiment, reference may be made to related descriptions of the embodiment shown in FIG. 4, and details are not described herein.

Optionally, the first channel state information includes at least one of broadband channel state information or sub-band channel state information.

For implementation of this embodiment, reference may be made to related descriptions of the embodiment shown in FIG. 4, and details are not described herein.

Optionally, the sub-bands are divided in one of the following manners: divided by frequency domain, divided by code domain, divided by space domain, divided by delay domain, and divided by Doppler domain.

For implementation of this embodiment, reference may be made to related descriptions of the embodiment shown in FIG. 4, and details are not described herein.

Optionally, information type of the first channel state information is the same as information type of channel state information of the reference time point;

or the information type of the first channel state information is determined based on capability information of the first device;

or the information type of the first channel state information is configured by the second device;

or the information type of the first channel state information is broadband channel state information;

or the information type of the first channel state information is sub-band channel state information; where the information type includes broadband channel state information and sub-band channel state information.

For implementation of this embodiment, reference may be made to related descriptions of the embodiment shown in FIG. 4, and details are not described herein.

Optionally, the method further includes:

determining expected channel state information based on the first information;

or determining expected channel state information based on the first information and channel state information of the reference time point.

In an implementation, the second device may directly determine expected channel state information based on the first information, that is, directly restore expected channel state information based on the predicted channel state information of the first time period. For example, if the first information is channel state information output by the first AI network, the second device may input the first information into a matching second AI network to obtain expected channel state information.

In another implementation, the second device may determine the expected channel state information based on the first information and the channel state information of the reference time point, that is, determines the expected channel state information based on the predicted channel state information of the first time period and the channel state information of the reference time point, so as to improve accuracy of the obtained channel state information. For example, if the first information is channel state information output by the first AI network, the second device can input both the channel state information output by the first AI network and the channel state information of the reference time point into the matching second AI network to obtain the expected channel state information.

Optionally, before the step of receiving the first information reported by the first device, the method further includes:

sending a first indication to the first device, where the first indication is used to indicate the first device to report predicted channel state information.

For implementation of this embodiment, reference may be made to related descriptions of the embodiment shown in FIG. 4, and details are not described herein.

It should be noted that this embodiment is used as an implementation of the second device corresponding to the embodiment shown in FIG. 4. For specific implementations of this embodiment, reference may be made to the related descriptions of the embodiment shown in FIG. 4, and same beneficial effects are achieved. To avoid repetition, details are not described herein again.

It should be noted that the foregoing implementations of this embodiment may be combined according to actual requirements.

Referring to FIG. 7, FIG. 7 is a structural diagram of an information reporting apparatus according to an embodiment of this application. As shown in FIG. 7, the information reporting apparatus 700 includes:

a first reporting module 701, configured to report first information to a second device.

The first information includes predicted first channel state information or second information determined based on the predicted first channel state information, and the first channel state information includes channel state information of a first time period after a reference time point.

Optionally, the first channel state information includes at least one of the following: precoding matrix indicator PMI, channel quality indicator CQI, rank indicator RI, layer indicator LI, original channel information, channel quality index value, beam information, time-domain stability index value of channel, large-scale parameter of channel, or first-device location information indicated by channel.

Optionally, the original channel information includes at least one of the following: a channel matrix, or feature information obtained by decomposing the channel matrix in a target decomposition manner.

Optionally, the target decomposition manner includes at least one of the following: singular value decomposition, triangular decomposition, regular triangular decomposition, Cholesky decomposition, or spectral decomposition.

Optionally, the beam information includes:
a reference signal RS identifier of beam and a beam quality index value in each time unit of the first time period;
or
an RS identifier of beam in each time unit of the first time period and a beam quality index value corresponding to the RS identifier.

Optionally, the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

Optionally, a start time point of the first time period is one of the following: the reference time point, a time point with a first duration ahead of the reference time point, and a time point with a second duration behind the reference time point; and
an end time point of the first time period is one of the following: a time point with K time units after the start time point of the first time period, a time point with a third duration ahead of K time units after the start time point of the first time period, and a time point with a fourth duration behind K time units after the start time point of the first time period, where K is a positive integer.

Optionally, the time unit includes one of the following: CSI reporting period, RS period, slot, half slot, symbol, subframe, radio frame, millisecond, second, and minute.

Optionally, parameters of the first time period are configured by the second device.

The parameters of the first time period include at least one of the following: the first duration, the second duration, a value of K, a type of the time unit, the third duration, or the fourth duration.

Optionally, the reference time point includes one of the following: a configuration time of current channel state information, a sending time of the current channel state information, a receiving time of the current channel state information, an activation time for reporting of the current channel state information, a trigger time for reporting of the current channel state information, and a reference signal measurement time of the current channel state information.

Optionally, the first channel state information is predicted based on second channel state information, and the second channel state information includes at least one of the following:
channel state information of the reference time point; or
channel state information of a third time period before the reference time point.

Optionally, the first channel state information is channel state information output by a first AI network after the second channel state information is input into the first AI network.

Optionally, the second information is information obtained through target processing on the first channel state information, and the target processing includes at least one of encoding processing or compression processing.

Optionally, the apparatus further includes:
a second reporting module, configured to report channel state information of the reference time point to the second device.

Optionally, the first channel state information includes at least one of broadband channel state information or sub-band channel state information.

Optionally, the sub-bands are divided in one of the following manners: divided by frequency domain, divided by code domain, divided by space domain, divided by delay domain, and divided by Doppler domain.

Optionally, information type of the first channel state information is the same as information type of channel state information of the reference time point;
or
the information type of the first channel state information is determined based on capability information of the first device;
or
the information type of the first channel state information is configured by the second device;
or
the information type of the first channel state information is broadband channel state information;
or
the information type of the first channel state information is sub-band channel state information; where
the information type includes broadband channel state information and sub-band channel state information.

Optionally, the apparatus further includes:
a sending module, configured to: before the first information is reported to the second device, receive a first indication sent by the second device, where the first indication is used to indicate the first device to report predicted channel state information.

The information reporting apparatus provided in this embodiment of this application is capable of implementing the processes of the method embodiment in FIG. 4. To avoid repetition, details are not described herein again.

It should be noted that the information reporting apparatus in this embodiment of this application may be an apparatus, or may be a component, an integrated circuit, or a chip in the first device.

Referring to FIG. 8, FIG. 8 is a structural diagram of another information reporting apparatus according to an embodiment of this application. As shown in FIG. 8, the information reporting apparatus 800 includes:
a first receiving module 801, configured to receive first information reported by a first device; where the first information includes predicted first channel state information or second information determined based on the predicted first channel state information, and the first channel state information includes channel state information of a first time period after a reference time point.

Optionally, the first channel state information includes at least one of the following: precoding matrix indicator PMI, channel quality indicator CQI, rank indicator RI, layer indicator LI, original channel information, channel quality index value, beam information, time-domain stability index value of channel, large-scale parameter of channel, or first-device location information indicated by channel.

Optionally, the original channel information includes at least one of the following: a channel matrix, or feature information obtained by decomposing the channel matrix in a target decomposition manner.

Optionally, the target decomposition manner includes at least one of the following: singular value decomposition, triangular decomposition, regular triangular decomposition, Cholesky decomposition, or spectral decomposition.

Optionally, the beam information includes:

a reference signal RS identifier of beam and a beam quality index value in each time unit of the first time period;

or an RS identifier of beam in each time unit of the first time period and a beam quality index value corresponding to the RS identifier.

Optionally, the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

Optionally, a start time point of the first time period is one of the following: the reference time point, a time point with a first duration ahead of the reference time point, or a time point with a second duration behind the reference time point; and an end time point of the first time period is one of the following: a time point with K time units after the start time point of the first time period, a time point with a third duration ahead of K time units after the start time point of the first time period, and a time point with a fourth duration behind K time units after the start time point of the first time period, where K is a positive integer.

Optionally, the time unit includes one of the following: CSI reporting period, RS period, slot, half slot, symbol, subframe, radio frame, millisecond, second, and minute.

Optionally, parameters of the first time period are configured by the second device.

The parameters of the first time period include at least one of the following: the first duration, the second duration, a value of K, a type of the time unit, the third duration, or the fourth duration.

Optionally, the reference time point includes one of the following: a configuration time of current channel state information, a sending time of the current channel state information, a receiving time of the current channel state information, an activation time for reporting of the current channel state information, a trigger time for reporting of the current channel state information, or a reference signal measurement time of the current channel state information.

Optionally, the first channel state information is predicted based on second channel state information, and the second channel state information includes at least one of the following:

channel state information of the reference time point; or channel state information of a third time period before the reference time point.

Optionally, the first channel state information is channel state information output by a first AI network after the second channel state information is input into the first AI network.

Optionally, the second information is information obtained through target processing on the first channel state information, and the target processing includes at least one of encoding processing or compression processing.

Optionally, the apparatus further includes: a second receiving module, configured to receive channel state information of the reference time point reported by the first device.

Optionally, the first channel state information includes at least one of broadband channel state information or sub-band channel state information.

Optionally, the sub-bands are divided in one of the following manners: divided by frequency domain, divided by code domain, divided by space domain, divided by delay domain, and divided by Doppler domain.

Optionally, information type of the first channel state information is the same as information type of channel state information of the reference time point;

or the information type of the first channel state information is determined based on capability information of the first device;

or the information type of the first channel state information is configured by the second device;

or the information type of the first channel state information is broadband channel state information;

or the information type of the first channel state information is sub-band channel state information; where the information type includes broadband channel state information and sub-band channel state information.

Optionally, the apparatus further includes:

a first determining module, configured to determine expected channel state information based on the first information;

or a second determining module, configured to determine expected channel state information based on the first information and channel state information of the reference time point.

Optionally, the apparatus further includes:

a sending module, configured to send a first indication to the first device before receiving the first information reported by the first device, where the first indication is used to indicate the first device to report predicted channel state information.

The information reporting apparatus provided in this embodiment of this application is capable of implementing the processes of the method embodiment in FIG. 6. To avoid repetition, details are not described herein again.

It should be noted that the information reporting apparatus in this embodiment of this application may be an apparatus, or may be a component, an integrated circuit, or a chip in the second device.

Figure 9:
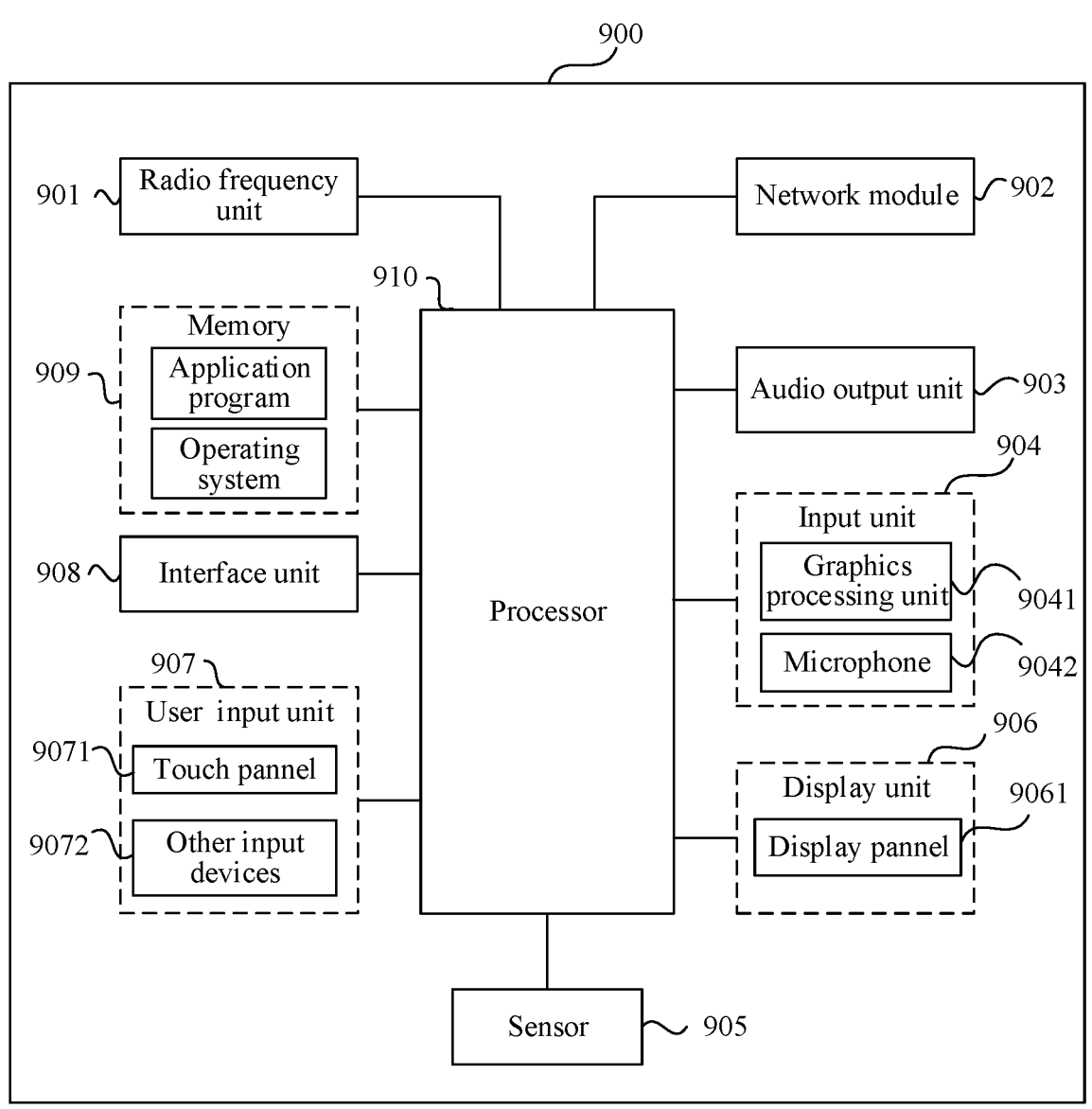
FIG. 9 is a structural diagram of a first device according to an embodiment of this application.

Referring to FIG. 9, FIG. 9 is a structural diagram of a first device according to an embodiment of this application. As shown in FIG. 9, the first device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the first device 900 may further include a power supply (for example, a battery) supplying power to the components, and the power supply may be logically connected to the processor 910 through a power management system. In this way, functions such as charge management, discharge management, and power consumption management are implemented by using the power management system. The structure of the terminal shown in FIG. 9 does not constitute any limitation on the terminal. The terminal may include more or fewer components than shown in the figure, or a combination of some components, or the components disposed differently. Details are not described herein again.

It may be understood that in this embodiment of this application, the input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, and the like. The user input unit 907 may include a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or a power on/off key), a trackball, a mouse, a joystick, and the like. Details are not described herein.

In this embodiment of this application, the radio frequency unit 901 receives downlink data from the second device, and then sends the downlink data to the processor 910 for processing; and also sends uplink data to the second device. Generally, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may include a program or instruction storage area and a data storage area. The program or instruction storage area may store an operating system, an application program or instruction required by at least one function (for example, a sound playback function or an image playback function), and the like. In addition, the memory 909 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 910 may include one or more processing units. Optionally, an application processor and a modem processor may be integrated in the processor 910. The application processor primarily processes an operating system, user interfaces, application programs or instructions, and the like. The modem processor primarily processes radio communication, for example, being a baseband processor. It can be understood that the modem processor may alternatively be not integrated in the processor 910.

The radio frequency unit 901 is configured to send first information to a second device.

The first information includes predicted first channel state information or second information determined based on the predicted first channel state information, and the first channel state information includes channel state information of a first time period after a reference time point.

It should be understood that in this embodiment, the processor 910 and the radio frequency unit 901 is capable of implementing the processes implemented by the first device in the method embodiment in FIG. 4, with the same technical effects achieved. To avoid repetition, details are not described herein again.

Optionally, an embodiment of this application further provides a first device, including a processor 910, a memory 909, and a program or an instruction stored in the memory 909 and capable of running on the processor 910. When the program or the instructions are executed by the processor 910, the processes of the foregoing information reporting method embodiments are implemented, with the same technical effects achieved. To avoid repetition, details are not described herein again.

Figure 10:
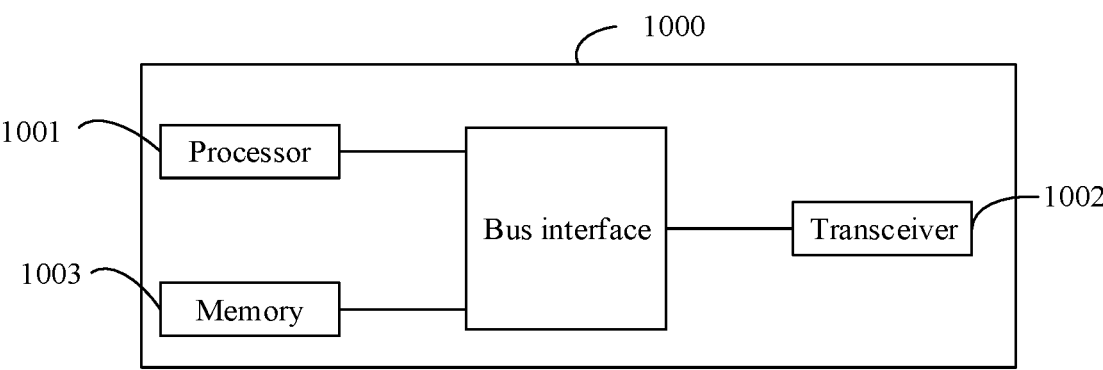
FIG. 10 is a structural diagram of a second device according to an embodiment of this application.

Referring to FIG. 10, FIG. 10 is a structural diagram of a second device according to an embodiment of this application. The second device 1000 includes a processor 1001, a transceiver 1002, a memory 1003, and a bus interface.

The transceiver 1002 is configured to receive first information reported by a first device; where the first information includes predicted first channel state information or second information determined based on the predicted first channel state information, and the first channel state information includes channel state information of a first time period after a reference time point.

It should be understood that in this embodiment, the processor 1001 and the transceiver 1002 is capable of implementing the processes implemented by the second device in the method embodiment in FIG. 6, with the same technical effects achieved. To avoid repetition, details are not described herein again.

It should be noted that the transceiver 1002 is configured to receive and send data under control of the processor 1001. The transceiver 1002 includes at least two antenna ports.

In FIG. 10, a bus architecture may include any quantity of interconnected buses and bridges, specifically for interconnecting various circuits of one or more processors represented by the processor 1001 and a memory represented by the memory 1003. The bus architecture may further interconnect various other circuits such as a peripheral device, a voltage regulator, and a power management circuit. These are all well known in the art, and therefore are not further described in this specification. The bus interface provides an interface. The transceiver 1002 may be a plurality of components, that is, the transceiver 1002 includes a transmitter and a receiver, and provides a unit for communicating with various other apparatuses on a transmission medium. For different user equipments, the user interface 1004 may also be an interface that can be externally or internally connected to a required device. The connected device includes but is not limited to a keypad, a display, a speaker, a microphone, a joystick, and the like.

The processor 1001 is responsible for bus architecture management and general processing. The memory 1003 may store data used when the processor 1001 performs an operation.

Optionally, an embodiment of this application further provides a second device, including a processor 1001, a memory 1003, and a program or an instruction stored in the memory 1003 and capable of running on the processor 1001. When the program or the instruction is executed by the processor 1001, the processes of the foregoing information reporting method embodiments are implemented, with the same technical effects achieved. To avoid repetition, details are not described herein again.

An embodiment of this application further provides a readable storage medium, where a program or an instruction is stored in the readable storage medium. When the program or the instruction is executed by a processor, the processes of the foregoing embodiments of the information reporting method on the terminal side or the information reporting method on the second device side can be implemented, with the same technical effects achieved. To avoid repetition, details are not described herein again.

The processor is the processor in the electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or an instruction to implement the processes of the foregoing embodiments of the information reporting method on the first device side or the information reporting method on the second device side, with the same technical effects achieved. To avoid repetition, details are not described herein again.

It should be understood that the chip in the embodiments of this application may also be referred to as a system-level chip, a system chip, a chip system, a system on chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An information reporting method, performed by a first device, wherein the method comprises:

reporting first information to a second device; wherein the first information comprises predicted first channel state information and the first channel state information comprises channel state information of a first time period after a reference time point;

wherein a start time point of the first time period is the reference time point; and an end time point of the first time period is one of the following: a time point with K time units after the start time point of the first time period, wherein K is a positive integer;

wherein the reference time point comprises: a sending time of the current channel state information.

2. The method according to claim 1, wherein the first channel state information comprises at least one of the following: precoding matrix indicator (PMI), channel quality indicator (CQI), rank indicator (RI), layer indicator (LI), original channel information, channel quality index value, beam information, time-domain stability index value of channel, large-scale parameter of channel, or first-device location information indicated by channel;

wherein the original channel information comprises at least one of the following: a channel matrix, or feature information obtained by decomposing the channel matrix in a target decomposition manner;

wherein the beam information comprises:

a reference signal (RS) identifier of beam and a beam quality index value in each time unit of the first time period;

or, an RS identifier of beam in each time unit of the first time period and a beam quality index value corresponding to the RS identifier;

wherein the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

3. The method according to claim 1, wherein the time unit comprises one of the following: CSI reporting period, RS period, slot, half slot, symbol, subframe, radio frame, millisecond, second, and minute.

4. The method according to claim 1, wherein parameters of the first time period are configured by the second device; wherein the parameters of the first time period comprise at least one of the following: the first duration, the second duration, a value of K, a type of the time unit, the third duration, or the fourth duration.

5. The method according to claim 1, wherein the first channel state information is predicted based on second channel state information, and the second channel state information comprises at least one of the following:

channel state information of the reference time point; or
channel state information of a third time period before the reference time point.

6. An information reporting method, performed by a second device, wherein the method comprises:

receiving first information reported by a first device; wherein
the first information comprises predicted first channel state information, and the first channel state information comprises channel state information of a first time period after a reference time point;
wherein a start time point of the first time period is the reference time point; and
an end time point of the first time period is one of the following: a time point with K time units after the start time point of the first time period, wherein K is a positive integer;
wherein the reference time point comprises: a sending time of the current channel state information.

7. The method according to claim 6, wherein the first channel state information comprises at least one of the following: precoding matrix indicator (PMI), channel quality indicator (CQI), rank indicator (RI), layer indicator (LI), original channel information, channel quality index value, beam information, time-domain stability index value of channel, large-scale parameter of channel, or first-device location information indicated by channel;

wherein the original channel information comprises at least one of the following: a channel matrix, and feature information obtained by decomposing the channel matrix in a target decomposition manner;
wherein the beam information comprises:
a reference signal (RS) identifier of beam and a beam quality index value in each time unit of the first time period;
or,
an RS identifier of beam in each time unit of the first time period and a beam quality index value corresponding to the RS identifier;
wherein the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

8. The method according to claim 6, wherein the time unit comprises one of the following: CSI reporting period, RS period, slot, half slot, symbol, subframe, radio frame, millisecond, second, and minute.

9. The method according to claim 6, wherein parameters of the first time period are configured by the second device; wherein the parameters of the first time period comprise at least one of the following: the first duration, the second duration, a value of K, a type of the time unit, the third duration, or the fourth duration.

10. A first device, comprising a memory, a processor, and a program or instructions stored in the memory and capable of running on the processor, wherein when the program or instructions are executed by the processor, the following steps are implemented:

reporting first information to a second device; wherein
the first information comprises predicted first channel state information and the first channel state information comprises channel state information of a first time period after a reference time point;
wherein a start time point of the first time period is the reference time point; and
an end time point of the first time period is one of the following: a time point with K time units after the start time point of the first time period, wherein K is a positive integer;
wherein the reference time point comprises: a sending time of the current channel state information.

11. The first device according to claim 10, wherein the first channel state information comprises at least one of the following: precoding matrix indicator (PMI), channel quality indicator (CQI), rank indicator (RI), layer indicator (LI), original channel information, channel quality index value, beam information, time-domain stability index value of channel, large-scale parameter of channel, or first-device location information indicated by channel;

wherein the original channel information comprises at least one of the following: a channel matrix, or feature information obtained by decomposing the channel matrix in a target decomposition manner;
wherein the beam information comprises:
a reference signal (RS) identifier of beam and a beam quality index value in each time unit of the first time period;
or,
an RS identifier of beam in each time unit of the first time period and a beam quality index value corresponding to the RS identifier;
wherein the time-domain stability index value of channel is determined according to at least one of the following: a variance of channel state information within a second time period, a worst value of channel state information within the second time period, a difference between an optimal value of channel state information within the second time period and the worst value of channel state information within the second time period, a change range of channel state information within the second time period, or a difference between a value of each piece of channel state information within the second time period and a limit value of channel state information within the second time period.

12. The first device according to claim 10, wherein the time unit comprises one of the following: CSI reporting period, RS period, slot, half slot, symbol, subframe, radio frame, millisecond, second, and minute.

13. The first device according to claim 10, wherein parameters of the first time period are configured by the second device; wherein the parameters of the first time period comprise at least one of the following: the first duration, the second duration, a value of K, a type of the time unit, the third duration, or the fourth duration.

14. A second device, comprising a memory, a processor, and a program or instructions stored in the memory and capable of running on the processor, wherein when the program or instructions are executed by the processor, the steps of the information reporting method according to claim 6 are implemented.

* * * * *